Patented June 19, 1951

2,557,258

UNITED STATES PATENT OFFICE 2,557,258

PROCESS FOR REMOVAL OF IMPURITIES FROM DICYANOBUTENE

William H. Calkins, Wilmington, Del., assignor to E. I. du Pont de Nemours and Company, Wilmington, Del., a corporation of Delaware No Drawing. Application February 23, 1950, Serial No. 145,924

5 Claims. (Cl. 260—465.8)

This invention relates to a method for separating copper from copper-contaminated 1,4-dicyano-2-butene.

Recently highly efficient methods have been disclosed for the preparation of 1,4-dicyano-2-butene by cyanation of dichlorobutenes in the presence of copper-containing catalysts in aqueous acidic media (Webb and Tabet, U. S. 2,477,672; cf. also Whitman, U. S. 2,477,674, also Johnson and Whitman, U. S. 2,477,617). The 1,4-dicyano-2-butene thus obtained is usually contaminated with traces of copper compounds. These contaminants interfere seriously with the distillation of 1,4-dicyano-2-butene, causing, in some instances, a rapid and very hazardous exothermic decomposition to occur. It has been highly desirable therefore to obtain a method for removing copper compounds from 1,4-dicyano-2-butene, thus reducing the copper content thereof to as low as 50 parts per million, or lower.

The removal of traces of copper from 1,4-dicyano-butene cannot readily be accomplished by ordinary methods because of the affinity of the copper compounds for the dicyanobutene phase, in the crude products obtained by cyanation of chlorobutenes in the presence of aqueous acids. The reason for this affinity is not necessarily understood, but it appears to be a result of the formation of a "complex" between the dicyanobutene and the copper salt. Evidence for this is found in the behavior of the crude products containing a 1,4-dicyano-2-butene phase and an aqueous phase; the latter, upon addition of HCl until the pH falls below 4, yields a tan-colored precipitate which contains cuprous cyanide and an organic component. This precipitate, upon boiling with 6N hydrochloric acid for a period of hours, yields cuprous cyanide and beta-dihydro muconic acid (the acid derivable by acid hydrolysis of 1,4-dicyanobutene), in mol ratio of about 2:1. This evidence strongly indicates that the affinity of the copper-containing compounds for 1,4-dicyano-2-butene (sometimes called "DNB") is due to the formation of a "complex" having the formula, DNB·2 CuCN.

An object of this invention is to provide a method for separating copper compounds from mixtures containing such compounds dissolved in 1,4-dicyano-2-butene. Other objects of the invention will be apparent hereinafter.

In accordance with this invention a process is provided for separating copper compounds from mixtures containing such compounds dissolved in 1,4-dicyano-2-butene, said compounds being the copper-containing products which are formed by reaction of HCN with dichlorobutene under aqueous acidic conditions in the liquid phase in the presence of a copper-containing catalyst, by extracting the said compounds from the said 1,4-dicyano-2-butene with aqueous HCN at a pH within the range of 4.0 to 7.0.

To facilitate contact between the organic layer and the aqueous layer in the practice of this invention an organic diluent for 1,4-dicyano-2-butene may be employed. Suitable diluents include benzene, toluene, xylene, carbon tetrachloride, cyclohexane, liquid alkanes, kerosene, liquid alkenes, etc. The quantity of diluent is not very highly critical, except that it is generally desirable to employ enough diluent to avoid crystallization of the normally solid isomeric form of 1,4-dicyano-2-butene during the extraction.

The extraction process herein disclosed may be carried out at ordinary temperatures. Suitable temperatures lie within the range of 10° C. to 100° C. Superatmospheric pressures may be employed but are unnecessary when the temperature does not exceed the boiling temperature of the mixture (i. e. the boiling temperature at substantially atmospheric pressure). It is somewhat advantageous to employ temperatures which are sufficiently high to effect "breaking" of the emulsions which are sometimes produced upon agitation of the extraction mixture. When benzene is employed as the diluent, the emulsion "breaks" at about 60° C.; in this instance a temperature between 60° C. and the boiling temperature of the mixture is accordingly preferred.

The initial concentration of HCN in the aqueous phase may be varied very widely in practicing the invention, but since only small quantities of copper-containing impurities are ordinarily encountered, relatively dilute solutions of HCN are preferred, i. e. solutions in which the HCN content is from 0.5 to 5.0% by weight, based on the weight of water present.

The most critical variable which must be controlled in the practice of the invention is the pH of the aqueous extracting medium. It is preferable to avoid the use of alkaline extracting media since alkali catalyzes decomposition of 1,4-dicyano-2-butene. On the other hand, it is desirable to avoid using a pH below 4, because a low pH results in separation of the cuprous cyanide-dicyanobutene precipitate as a solid phase. The range of pH between 4.0 and 7.0 is therefore preferred. Even within this narrow range pronounced differences are observed, the separation of copper from the organic phase being many times more efficient at a pH of 6 than at a pH of 5. The pH can, of course, be adjusted by any convenient method; it can be adjusted, for example, by adding appropriate relative quantities of dilute HCl and dilute NaCN. Any suitable buffer may be employed, if desired.

It will be understood that the nature of the copper-containing material is not known with certainty, except by reference to the fact that it is formed by reacting HCN with dichlorobutene in the presence of copper-containing catalyst dissolved in an aqueous acidic liquid medium. The said dichlorobutene is obtainable by adding two chlorine atoms to butadiene, and is converted to 1,4-dicyano-2-butene on cyanation as disclosed in U. S. Patent 2,477,672. In this connection it is noteworthy that it is the 1,4-dicyano isomer which is obtained, no matter which dichlorobutene isomer undergoes the cyanation reaction.

The invention is illustrated further by means of the following example.

*Example.*—Into a 37% (by weight) aqueous hydrochloric acid solution containing 0.05 m. HCl was added 0.05 m. cupric chloride (CuCl$_2$), and a dilute (2.0 N) sodium cyanide solution was introduced dropwise, with agitation, at a temperature of 70° C. until the pH (as measured by a calomelglass electrode system) reached 6.0. One mol of dichlorobutene (containing 3,4-dichloro-1-butene and 1,4-dichloro-2-butene) was then added and sodium cyanide addition was continued at a rate which was controlled so as to maintain the pH within the range of 4.8 to 5.5. Completion of the cyanation reaction was indicated by the fact that the pH ceased drifting when about two mols of sodium cyanide had been introduced. When this stage was reached the pH was adjusted to about 5.5–6.6, and no additional quantities of sodium cyanide were required to maintain the pH at that level. The resulting product was in two layers. The products of several such runs were combined and a series of experiments on copper removal were carried out by decanting the combined product, extracting the water layer three times with benzene, combining the benzene extract and the organic layer to give a mixture containing approximately 500 grams of benzene and 450 grams of dicyanobutene, and extracting the benzene layer with 1% (by weight) aqueous HCN solution. Finally the 1,4-dicyanobutene was crystallized out of the benzene solution by cooling at 5° to 7° C. Copper analyses on these products are shown in the following table:

TABLE

*Effect of pH on removal of copper from dicyanobutene by extraction with aqueous HCN*

| pH of Aqueous Phase during Separation and Extraction | Amounts of 1% HCN Solution Used as Wash | pH of Wash | Copper in Crystallized Product |
|---|---|---|---|
| | | | P. P. M. |
| 5.5 | None | | 200 |
| 5.5 | ....do | | 290 |
| 5.5 | 5% of total extract | 5.0 | 170 |
| 5.5 | Twice with 5% of total extract | 6.0 | 34 |
| 6.6 | 5% of total extract | 6.0 | ¹ 12 |
| 6.5 | Twice with 5% of total extract | 6.0 | 0.8 |

¹ A test of the benzene mother liquor after crystallization of this sample showed 12 P. P. M. copper.

It is to be understood that this example is illustrative only and that numerous embodiments of the invention will occur to those who are skilled in the art.

While the method herein disclosed is especially directed to removal of copper, it is significant that other metallic impurities are simultaneously removed. For example, iron compounds, which, like copper compounds, catalyze the thermal decomposition of 1,4-dicyano-2-butene, are removed therefrom by the method of this invention.

The separation of copper compounds from 1,4-dicyano-2-butene in accordance with this invention may be continued until virtually complete separation is attained, but this is usually not necessary, nor is it always economically feasible. Usually the extraction is continued until the copper content is reduced to about 50 parts per million, or less, or, for even better assurance against exothermal decomposition, about 15 parts per million.

The present invention is effective regardless of the form of the copper-containing compounds. For example, when the copper-containing cyanation catalyst is introduced into the reaction mixture in the form of an inorganic or organic salt of copper, e. g. cupric chloride, and the acidic pH is adjusted by adding NaCN, the copper salt becomes reduced and converted by the action of acid and NaCN to cuprous cyanide which dissolves in excess NaCN to form a complex compound whose proportions may be represented by the formula, Na$_3$Cu(CN)$_4$. The latter compound is an effective source of copper contamination, as explained hereinabove.

The present invention is useful in a great many ways, and is especially valuable as a method for eliminating hazards which attend the distillation of crude 1,4-dicyano-2-butene having an uncontrolled copper content.

I claim:

1. The process for separating copper compounds from mixtures containing such compounds dissolved in 1,4-dicyano-2-butene, said compounds being the copper-containing products which are formed by reaction of HCN with dichlorobutene under aqueous acidic conditions in the liquid phase in the presence of a dissolved copper-containing catalyst, which comprises extracting the said compounds from the said 1,4-dicyano-2-butene with aqueous HCN at a pH within the range of 4.0 to 7.0.

2. The process of claim 1, in which the said extraction is carried out in the presence of benzene as a diluent for 1,4-dicyano-2-butene.

3. The process of claim 1, in which the temperature during the extraction step is within the range of 10° C. to 100° C.

4. The process of claim 1, in which the concentration of aqueous HCN during the said extraction is from 0.5 to 5.0% by weight based on the weight of water present.

5. In a process for separating copper compounds from mixtures containing such compounds dissolved in 1,4-dicyano-2-butene, said compounds being the copper-containing products which are formed by reaction of HCN with 1,4-dichloro-2-butene under aqueous acidic conditions in the liquid phase in the presence of CuCN dissolved in NaCN in proportions represented by Na$_3$Cu(CN)$_4$, the step which comprises extracting the said copper-containing products from the said 1,4-dicyano-2-butene in the presence of a benzene diluent, at a temperature above 60° C. but not exceeding the boiling temperature of the mixture, with an aqueous solution of hydrogen cyanide at a pH within the range of 5.0 to 7.0.

WILLIAM H. CALKINS.

REFERENCES CITED

The following references are of record in the file of this patent:

UNITED STATES PATENTS

| Number | Name | Date |
|---|---|---|
| 2,448,755 | Zellner | Sept. 7, 1948 |